(12) United States Patent
Arnott

(10) Patent No.: US 6,796,047 B2
(45) Date of Patent: Sep. 28, 2004

(54) ANGLE CUTTING TRANSFER TOOL AND METHOD

(76) Inventor: John Arnott, 13400 Dumas Rd. #M-1, Mill Creek, WA (US) 98012

( * ) Notice: Subject to any disclaimer, the term of this patent is extended or adjusted under 35 U.S.C. 154(b) by 0 days.

(21) Appl. No.: 10/448,775

(22) Filed: May 29, 2003

(65) Prior Publication Data

US 2004/0000064 A1 Jan. 1, 2004

Related U.S. Application Data

(60) Provisional application No. 60/392,001, filed on Jun. 26, 2002.

(51) Int. Cl.[7] .................................................. B43L 7/10
(52) U.S. Cl. ........................................ 33/465; 33/27.01
(58) Field of Search ..................... 33/1 F, 1 N, 1 SD, 33/1 AP, 27.01, 27.02, 27.03, 418, 420, 422, 428, 462, 465, 534

(56) References Cited

U.S. PATENT DOCUMENTS

| | | | |
|---|---|---|---|
| 320,718 A | 6/1885 | Steers | |
| 456,105 A | 7/1891 | Adams | |
| 707,461 A | 8/1902 | Stedman | |
| 796,030 A | * 8/1905 | Baumgartner | ................ 33/420 |
| 1,170,174 A | * 2/1916 | Matson | ...................... 33/27.03 |
| 1,662,006 A | 3/1928 | Krumm | |
| 2,110,636 A | 3/1938 | Sharp | ............................. 33/98 |
| 2,222,853 A | * 11/1940 | Neurohr | ....................... 33/1 N |
| 2,460,713 A | * 2/1949 | Richardson | ................... 33/453 |
| 4,095,342 A | * 6/1978 | Oertli | ......................... 33/1 SD |
| 4,866,853 A | * 9/1989 | Braden | ......................... 33/465 |
| 5,359,782 A | 11/1994 | Langmaid | ..................... 33/415 |
| 5,440,818 A | * 8/1995 | Mailhot | ....................... 33/452 |
| 6,148,531 A | * 11/2000 | Economaki | .................. 33/465 |
| 6,604,294 B1 | * 8/2003 | Farley | ....................... 33/27.03 |

* cited by examiner

*Primary Examiner*—G. Bradley Bennett
(74) *Attorney, Agent, or Firm*—Dean A. Craine

(57) ABSTRACT

An angle cutting transfer tool for determining and delineating the midline axis of a joint onto a workpiece for cutting on a saw. The transfer tool includes two leg members pivotally connected together at one end. Pivotally attached to the inside edge of each leg member is a blade. During use, the two leg members are placed between two adjoining substructure surfaces upon which the two workpieces are to be joined. The transfer tool is then removed and one leg member is longitudinally aligned over a template. The blades are then rotated until they intersect at an equidistant point along one edge of the blades. A line is then drawn on the template from the center axis of the transfer tool to the intersecting point of the blades which delineates the midline axis of the joint. The miter or table saw is then adjusted so that the blade cuts along the line that delineates the midline axis of the joint. The workpieces are then selected and cut with the saw.

1 Claim, 3 Drawing Sheets

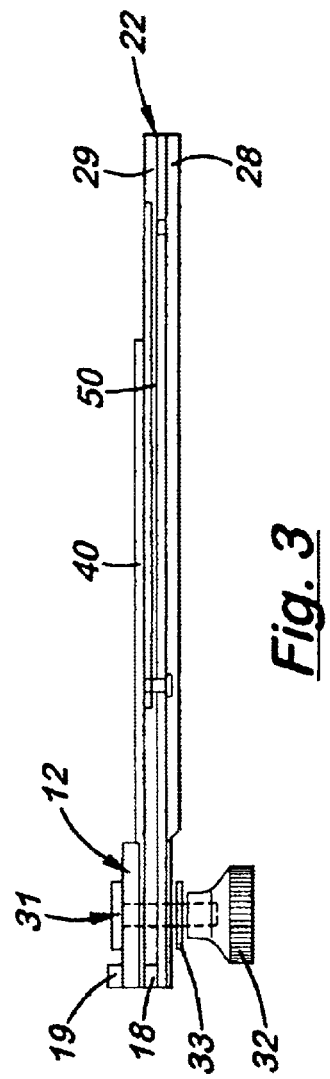
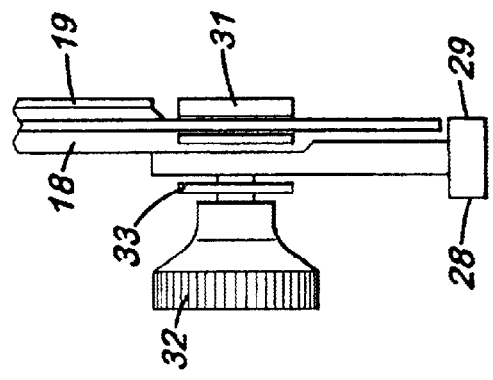

ANGLE CUTTING TRANSFER TOOL AND METHOD

This is a utility patent application which claims benefit of U.S. Provisional Application No. 60/392,001 filed on Jun. 26, 2002.

BACKGROUND OF THE INVENTION

1. Field of the Invention

This invention pertains to guides used to measure angles and, more particularly, to guides used to transfer the angle between two adjoining surfaces to a cutting tool for cutting workpieces to be joined together.

2. Description of the Related Art

Craftsmen who install millwork are required to cut expensive pieces of wood. Ideally, the pieces of wood must be precisely cut so that they may be joined together with little or no gap formed between the adjoining ends.

Typically, craftsmen measure the angles of the joint with a T-bevel square and then use the T-bevel square to mark their workpieces or to adjust their power saws to the desired angle for cutting the workpieces. For cosmetic reasons, it is desirable to cut the workpieces so that the workpieces are joined together at the midline axis of the joint. Unfortunately, miscalculations occur, or the saw blade is slightly out of alignment, thereby producing imprecise cuts that produce large, unsightly gaps in the joint. To eliminate this problem, craftsmen are forced to recheck their calculators and check the angle of the saw blade before each cut. This, of course, is very time consuming.

What is needed is a transfer tool and method that enables a craftsman to easily and precisely determine the midline axis of a joint that can be easily indicated on a workpiece for cutting with a saw.

SUMMARY OF THE INVENTION

It is an object of the present invention to provide an angle cutting transfer tool used to determine the angle of the midline axis of a joint for adjoining two workpieces around the joint.

It is another object of the present invention to provide such a tool that does not require mental calculation nor rely on the often-inaccurate typical angle selector on a power saw.

It is another object of the present invention to provide such a tool that is easy to use.

These and other objects which will become apparent are met by a transfer tool that allows a user to determine the midline axis of an inside or outside corner joint and then transfer this information to a power saw that will be used to cut two final workpieces to be joined together around the joint. The transfer tool includes two leg members pivotally attached together at one end. Pivotally attached on each leg member, at the same, predetermined distance from the adjoined end, is a blade with optional distance markings printed thereon. During use, each blade rotates on the leg member between a longitudinally aligned position and an extended position. When disposed in the longitudinally aligned position, the inside edges of the leg members are pressed against the surfaces surrounding a joint to transmit the total or outside angle of the joint to a template board. The transfer tool is first aligned on the template board so that one leg member is aligned on a straight edge. The inside edges of the two leg members are then traced with a pencil to delineate the outside angle of the joint. The blades on each leg member are then rotated to an extended position until they cross and intersect at a point or the midline axis of the joint. A line is drawn for the template board from the intersecting point on the two lines drawn along the leg members to the midline intersecting point. The transfer tool is then removed from the template board and the template board is then taken to a miter or table saw for properly aligning the saw fence and blade. The straight edge on the template board is first aligned with the saw fence. The angle of the saw blade relative to the fence is then adjusted to cut along the line that delineates the midline axis of the joint. Once the angle of the saw blade is properly adjusted, the template board is removed and the two workpieces are then individually selected and cut using the saw blade or fence.

In the preferred embodiment, each blade includes at least one pencil hole that enables the user to insert the tip of a pencil and rotate the blade toward the other blade and mark on the template board. The pencil holes on the two blades are equidistant from their pivoting ends thereby enabling them to be used as a compass to draw two identical diameter-intersecting arcs. Optional pencil tip slots are also formed on the two leg members so that each blade, when longitudinally aligned on the leg member, may be easily grasped and rotated to an extended position.

DESCRIPTION OF THE DRAWINGS

FIG. 3 is a top plan view of the invention.

FIG. 4 is an end elevational view of the invention.

DESCRIPTION OF THE PREFERRED EMBODIMENT(S)

Figure 1:
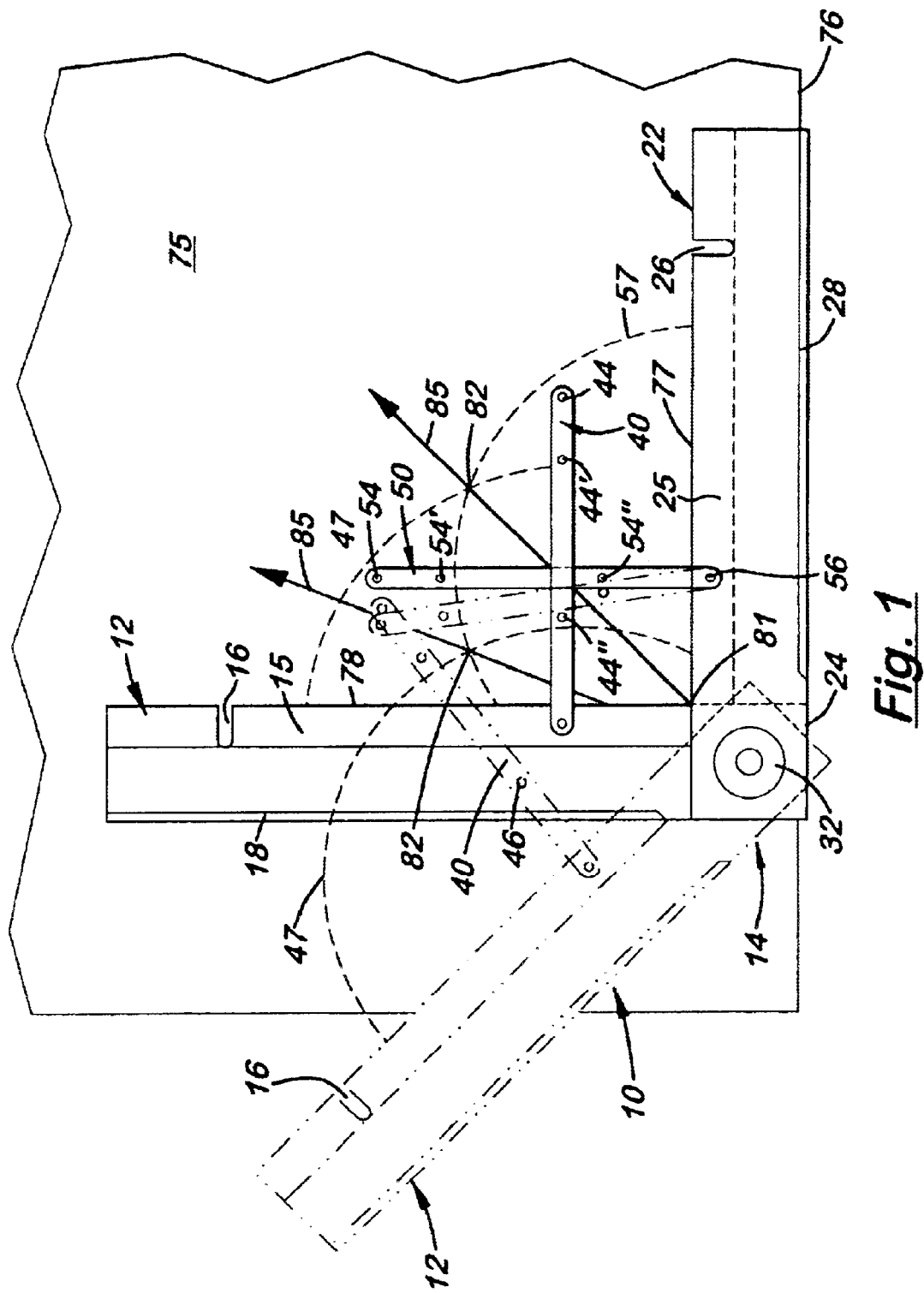
FIG. 1 is a side elevational view of an angle cutting transfer tool used to determine and accurately transfer the midline axis of a joint to a workpiece.
Figure 2:
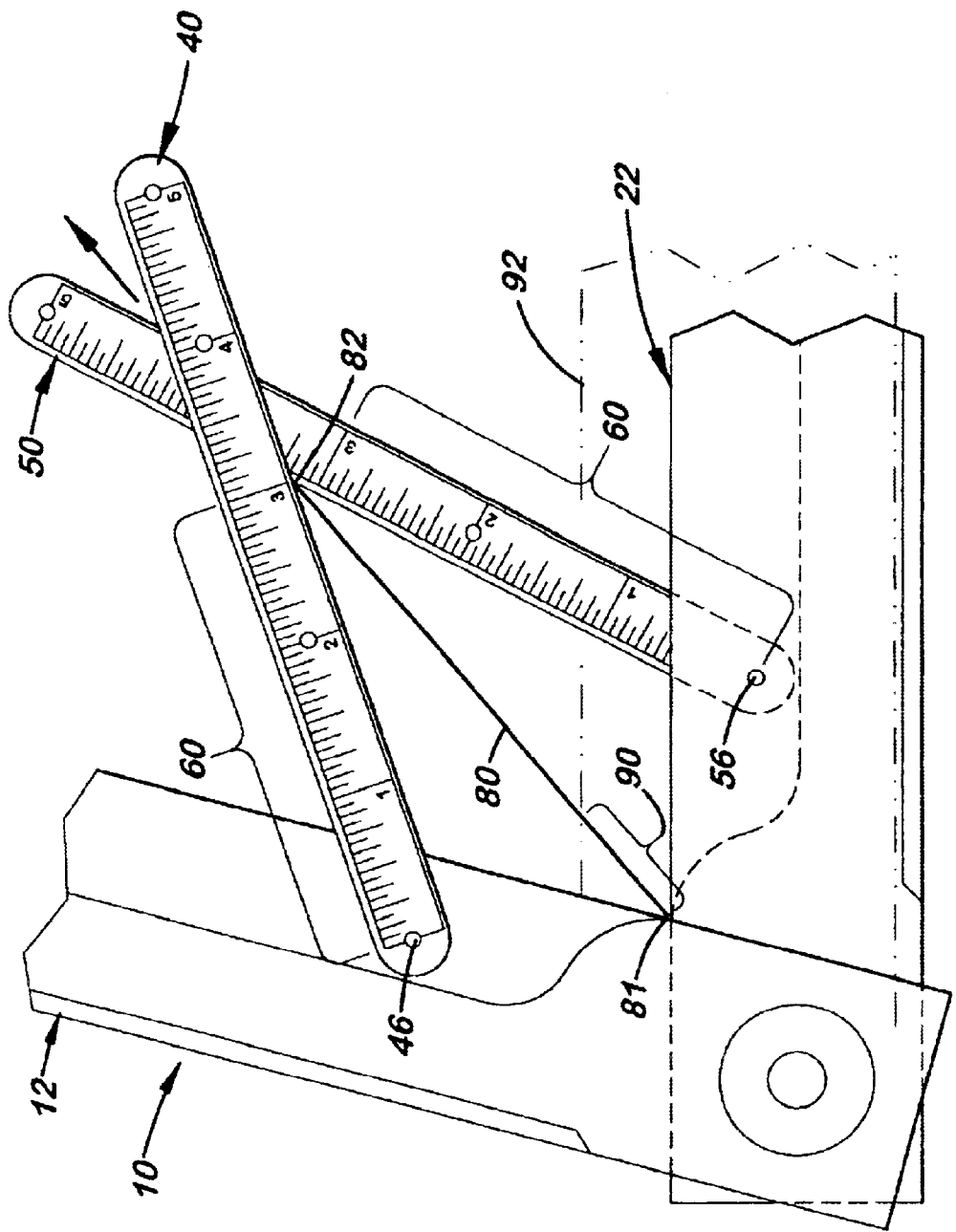
FIG. 2 is an enlarged side elevational view of the invention shown in FIG. 1.

In FIGS. 1–4, there is shown a transfer tool generally referenced as 10 that allows a user to determine the midline axis of a joint and then transfer this information to two workpieces to be joined together around a joint. The transfer tool 10 includes a first and second leg member 12, 22, respectively, pivotally attached together at their proximal ends 14, 24, respectively. Pivotally attached at a predetermined distance from the proximal ends 14, 24 on each leg member 12, 22 are a first and second blade 40, 50, respectively, with optional distance markings 60 printed thereon. During use, each blade 40, 50 rotates on the leg member 12, 22, respectively, so that the distal ends of the first and second blades 40, 50 cross and intersect at a point an equal distance along the inside edge of each blade 40, 50. Typically, the user draws two arcs 47, 57 with the same radius that intersect at a point 82 along the midline axis of the joint.

In the preferred embodiment, the first and second leg members 12, 22 include two front and rear raised edges 18, 19 and 28, 29, respectively, formed on the outside edges, as shown in FIG. 3. The raised abutment edges 18, 19 and 28, 29 act as abutment surfaces for longitudinally aligning the transfer tool 10 on a template board 75. Each first and second leg member 12, 22 may also include a longitudinally aligned, recessed surface 15, 25, respectively, which receives and partially holds the blade 40, 50 when in a longitudinally aligned position on the leg member 12, 22, respectively. The recessed surface 15, 25 on the leg members 12, 22 are offset so that the leg members 12, 22 may be aligned in a closed, parallel configuration for compact storage. In the preferred embodiment, the first and seconded leg members 12, 22 are 7 to 12 inches in length and made of stainless steel, aluminum, or plastic.

The first and second leg members 12, 22 are pivotally connected together with a threaded bolt 31 that extends through two bores (not shown) formed near the proximal ends 14, 24 of the leg members 12, 22. Attached to the end of the bolt 31 is a washer 32 and nut 33. During use, the nut 33 is selectively tightened to lock the first and second leg members 12, 22 together. Formed near the distal end and along the inside edge opposite the raised edges 18, 19 and 28, 29 of each first and second leg members 12, 22 is an optional pencil tip slot 16, 26, respectively. During use, the tip of a pencil (not shown) may be inserted into the pencil tip slots 16, 26 to engage pencil holes 44, 54 formed on the blades 40, 50 to rotate the blades 40, 50 from a longitudinally aligned, nested position on each leg member 12, 22, respectively.

The blade members 40, 50 include optional 1/16 inch distance markings 60 printed along their inside edges. In the preferred embodiment, the blade members 40, 50 are approximately ½ inches in width, 4 inches in length, and made of stainless steel or aluminum. A rivet 56 is used to pivotally attach the proximal end of each blade 40, 50 at a predetermined location (approximately 3 inches from the proximal end of the leg member 12, 22) on each leg member 12, 22. Formed near the distal end of each blade 40, 50 is a pencil hole 44, 54 that is aligned and registered with the pencil tip slot 16, 26 formed on the adjacent leg member 12, 22, respectively. In the embodiment shown in the FIGS., two additional pencil holes 44', 44", 54', 54" are spaced apart and longitudinally aligned on each blade 40, 50. The pencil holes 44, 54 are equidistant from the distal end of the blades 40, 50 so that the user may insert the pencil tip into equidistant holes to draw two intersecting arcs with identical diameters.

To use the transfer tool 10 to determine the proper bisecting angle cuts on two adjoining workpieces on a joint, a template board 75 made of wood with one straight edge 76 is first selected. The template board 75 is used as a template or guide tool for adjusting the proper blade angle (one-half of the outside angle of the joint) on a miter saw or table saw that will be used to cut the two adjoining workpieces. First, the transfer tool 10 is positioned around an inside or outside joint with each leg members 12, 22 pushed against the two adjacent surfaces around the joint. Next, the nut 33 is tightened so that the leg members 12, 22 are locked in position so that the angle of the joint is maintained when the tool 10 is removed from the joint. The transfer tool 10 is then positioned over the template board 75 so that one leg member 12, 22 is aligned with the straight edge 76. The user then selects a pencil and draws two intersecting lines 77, 78 along the inside edges of the two leg members 12, 22. The intersecting point 81 of the two lines 77, 78 the midline axis of the joint.

After the outside angle of the joint has been drawn on the template board 75, a pencil tip is then inserted into the pencil tip slots 16, 26 formed on the leg member 12, 22 and the pencil holes 44, 54 formed on the blade 40, 50 to rotate them from the leg member 12, 22. Using the same pencil hole 44, 54 to rotate the blade 40, 50 from the leg member 12, 22 or one of the other pencil holes 44, 54 the blade, the pencil is used to draw two intersecting arcs 47, 57 to find a second point 82 on the midline axis for the joint. The transfer tool 10 is then moved from the template board 75 and used to draw a straight line 85 from the two points 81, 82 on the midline axis.

The template board 75 is then taken to a miter saw or table saw where the template board 75 straight edge 76 is abutted against the saw fence. The fence is tightened and the saw blade is then adjusted to be aligned with the drawn straight line 85. The template board 75 is then removed from the saw so that the saw might be used to cut the two adjoining workpieces.

In compliance with the statute, the invention described herein has been described in language more or less specific as to structural features. It should be understood, however, that the invention is not limited to the specific features shown, since the means and construction shown, is comprised only of the preferred embodiments for putting the invention into effect The invention is therefore claimed in any of its forms or modifications within the legitimate and valid scope of the amended claims, appropriately interpreted in accordance with the doctrine of equivalents.

I claim:

1. A method of cutting workpieces to be joined together around a joint comprising the following steps:

a. selecting an angle cutting transfer tool including a first and second leg member pivotally connected together at one end, means to lock said first and second leg members together, and a straight blade pivotally attached at one end to each said leg member with means for delineating distance on each said blade;

b. aligning said first and second leg members on said transfer tool between two surfaces around a joint which two workpieces are to be cut and joined together;

c. adjusting said first and second leg members on said transfer tool between said surfaces;

d. selecting a template board with one straight edge;

e. aligning said transfer tool on said template board that one said leg member is aligned over said straight edge and the opposite said leg members is disposed over said template board;

f. tracing the edges of said leg members and creating a first point on the midline axis between said leg members;

g. rotating said blades until they intersect to determine a second point along the midline axis between said leg members;

h. marking a line between said first and second points along the midline axis;

i. removing said transfer tool from said template board and aligning said straight edge against the fence on a power saw used to cut the workpieces to be joined around a joint;

h. adjusting the angle of the saw blade with said midline axis line drawm on said template board;

i. selecting a first and second workpieces that will joined together around said joint; and, j. using a power saw to cut said first and second workpieces.

* * * * *